United States Patent
Previti (10) Patent No.: US 9,456,300 B2
(45) Date of Patent: Sep. 27, 2016

(54) METHOD OF COMMUNICATION OF THE GEOGRAPHIC POSITION OF A MOBILE TERMINAL AND MOBILE TERMINAL THEREOF

(75) Inventor: Gianluca Previti, Turin (IT)

(73) Assignee: SISVEL TECHNOLOGY S.R.L., None (TO) (IT)

( * ) Notice: Subject to any disclaimer, the term of this patent is extended or adjusted under 35 U.S.C. 154(b) by 84 days.

(21) Appl. No.: 13/977,551

(22) PCT Filed: Feb. 1, 2012

(86) PCT No.: PCT/IB2012/050462
§ 371 (c)(1),
(2), (4) Date: Jun. 28, 2013

(87) PCT Pub. No.: WO2012/104792
PCT Pub. Date: Aug. 9, 2012

(65) Prior Publication Data
US 2013/0281119 A1    Oct. 24, 2013

(30) Foreign Application Priority Data
Feb. 2, 2011 (IT) .............................. TO2011A0088

(51) Int. Cl.
*H04W 24/00* (2009.01)
*H04W 4/02* (2009.01)
(Continued)

(52) U.S. Cl.
CPC .................. *H04W 4/02* (2013.01); *H04W 8/14* (2013.01); *H04W 4/22* (2013.01); *H04W 8/22* (2013.01); *H04W 76/007* (2013.01)

(58) Field of Classification Search
CPC ..... H04W 4/02; H04W 60/00; H04W 64/00; H04W 8/04; H04W 4/22; H04W 8/22; H04W 76/007

USPC ........................................................ 455/456.1
See application file for complete search history.

(56) References Cited

U.S. PATENT DOCUMENTS

2005/0124316 A1    6/2005 Islam et al.
2007/0008948 A1    1/2007 Jung et al.
(Continued)

FOREIGN PATENT DOCUMENTS

| CN | 1976497 A | 6/2007 |
|---|---|---|
| CN | 100499937 | 6/2009 |

(Continued)

OTHER PUBLICATIONS

English translation of Taiwanese Patent Search Report dated Nov. 18, 2014, issued in Taiwan Patent Application No. 101103418, filed Feb. 2, 2012.

(Continued)

*Primary Examiner* — Huy C Ho
(74) *Attorney, Agent, or Firm* — Workman Nydegger (57) ABSTRACT

A method of communication between a calling terminal (M1) and a called terminal (M2), which can be connected to each other through at least one mobile communication network (R1,R2), the called terminal (M2) being equipped with a system for detecting its geographic position, the method including the steps of: sending a connection message from the calling terminal (M1) to the called terminal (M2) through the at least one communication network (R1,R2); sending an answer message from the called terminal (M2) to the calling terminal (M1) through the at least one communication network (R1,R2), wherein the called terminal (M2) enters geographic position information (GPS2) into the answer message and sends the answer message to the calling terminal (M1).

13 Claims, 7 Drawing Sheets

(51) Int. Cl.
*H04W 8/14* (2009.01)
*H04W 4/00* (2009.01)
*H04W 4/22* (2009.01)
*H04W 8/22* (2009.01)
*H04W 76/00* (2009.01)

(56) References Cited

U.S. PATENT DOCUMENTS

2007/0225017 A1  9/2007  Li et al.
2008/0009293 A1  1/2008  Bennett et al.
2009/0052422 A1* 2/2009  Kim et al. .................... 370/338

FOREIGN PATENT DOCUMENTS

| JP | 2003-115953 | | 4/2003 |
|----|----|----|----|
| JP | 2007-20193 | | 1/2007 |
| WO | 2007/043753 | A1 | 4/2007 |
| WO | 2008/085993 | A2 | 7/2008 |

OTHER PUBLICATIONS

*Digital Cellular Telecommunications System (Phase 2+); Universal Mobile telecommunications System (UMTS); LTE; Mobile Radio Interface Lay 3 Specification; Core Network Protocols; Stage 3 (3GPP TS 24.008 version 9.5.0 Release 9)*, Jan. 1, 2001, XP014061893, pp. 1-614.
International Search Report dated Apr. 4, 2012, issued in PCT Application No. PCT/IB2012/050462, filed Feb. 1, 2012.
Written Opinion dated Apr. 4, 2012, issued in PCT Application No. PCT/IB2012/050462, filed Feb. 1, 2012.

\* cited by examiner

| | 1 | 2 | 3 | 4 | 5 | 6 | 7 | 8 | |
|---|---|---|---|---|---|---|---|---|---|
| | | | spare | | 1 | 0 | 0 | 1 | Octet 1 |
| | | | | | | | | S | Octet 2 |
| | Degrees of latitude | | | | | | | | Octet 3 |
| | | | | | | | | | Octet 4 |
| | | | | | | | | | Octet 5 |
| | Degrees of longitude | | | | | | | | Octet 6 |
| | | | | | | | | | Octet 7 |
| | | | | | | | | D | Octet 8 |
| | Altitude | | | | | | | | Octet 9 |
| | Uncertainty semi-major | | | | | | | 0 spare | Octet 10 |
| | Uncertainty semi-minor | | | | | | | 0 spare | Octet 11 |
| | Orientation of major axis | | | | | | | | Octet 12 |
| | Uncertainty Altitude | | | | | | | 0 spare | Octet 13 |
| | Confidence | | | | | | | 0 spare | Octet 14 |

METHOD OF COMMUNICATION OF THE GEOGRAPHIC POSITION OF A MOBILE TERMINAL AND MOBILE TERMINAL THEREOF

BACKGROUND OF THE INVENTION

1. Field of the Invention

The present invention relates to the telecommunications field, in particular to a mobile telephone communication method.

More in particular, the method according to the invention applies to terminals which are capable of connecting through radio waves to a network distributed over a territory, typically with cellular coverage, and which need to signal their position within that area during a voice call.

2. Present State of the Art

An increasing number of the latest mobile terminals include a receiver for detecting their position, e.g. of the GPS, a-GPS, etc. type, thus offering the user services based on geographic localization, such as map look-up, searching for points of interest, assisted navigation, and georeferencing of multimedia contents.

In some situations it is necessary or desirable to know the geographic position of the called terminal with some accuracy.

This requirement may be felt, for example, when a user needing assistance, e.g. because he/she cannot move, does not exactly know his/her own geographic coordinates and needs help, e.g. on a ski slope. Or when the user cannot make any calls with his/her mobile terminal because, for example, he/she has no credit left on his/her prepaid card.

In other situations it may be useful to localize a called terminal installed in a mobile means, such as a vehicle, that must be localized, e.g. in the event of a theft or an accident.

In other situations, it may be desirable that a calling terminal and a called terminal make known to each other their respective geographic positions; for example, two users in unknown places who want to meet will find it useful to be able to obtain information about their reciprocal positions.

Mobile telephone terminals are known in the art which can transmit their position during emergency calls. International patent application No. WO 2008/085993 describes an LTE telephone device equipped with a localization device, e.g. a GPS receiver, which uses position information in order to connect more efficiently to the network. The terminal described in said patent application can also enter information about its position into connection messages generated during emergency calls, so that the caller's position can be determined as quickly as possible.

In the system described in said international patent application, only the calling terminal is given the possibility to communicate its position to emergency management services. However, no information can be obtained about the geographic position of the called terminal.

U.S. patent application US 2008/0009293 describes a method for informing the calling user about the network to which the called terminal is locked. Upon requesting the call, the calling terminal apprehends if the called terminal is abroad and which network it is currently registered with. The calling user can thus decide to give up the call so as to prevent the called user from incurring in connection costs or, if the called user is in a different time zone, to avoid calling him/her at improper times.

In such a system, the calling terminal interrogates a database in the network of the operator of the called terminal to obtain the identification information of the network to which the called terminal is connected (network identifier). However, the caller receives no accurate information about the geographic coordinates of the called terminal.

Figure 1:
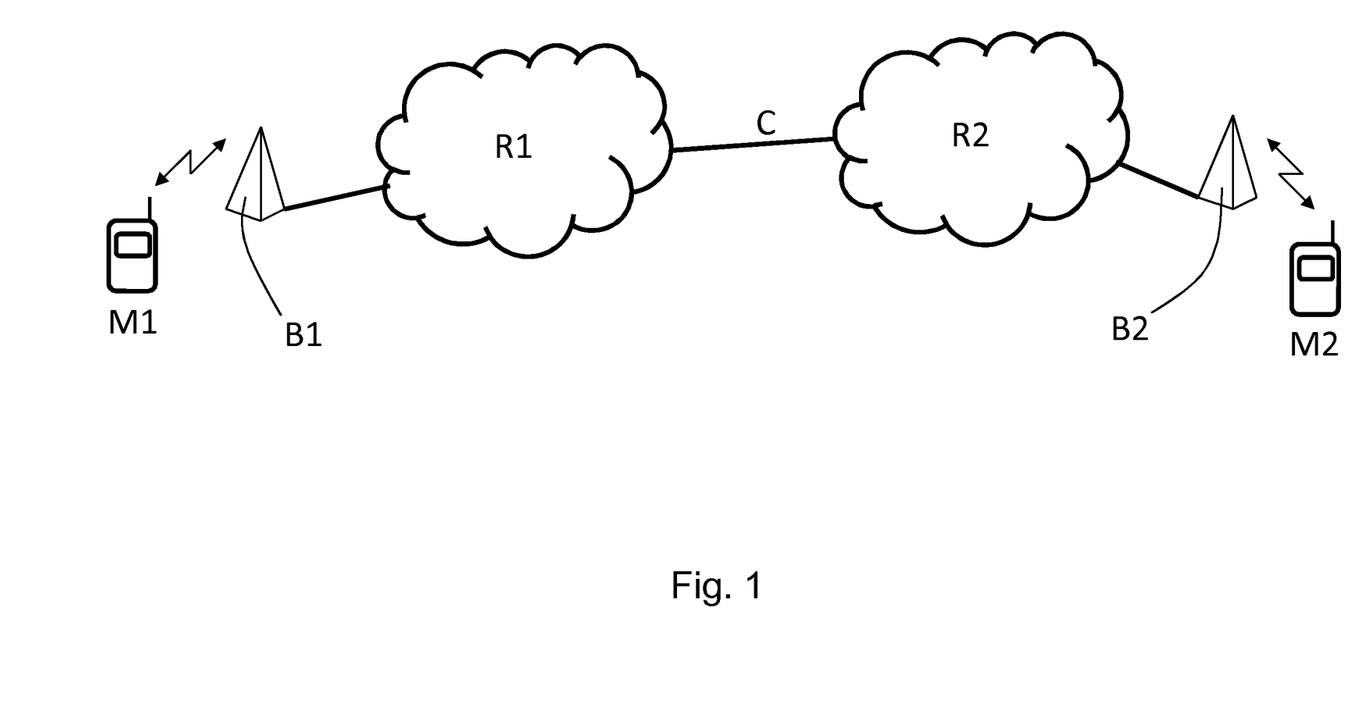
FIG. 1 shows a prior-art system comprising a number of elements involved in a voice communication between two mobile terminals.

FIG. 1 shows a simplified diagram of a typical mobile communication system. The system shown in FIG. 1 comprises a calling mobile terminal M1 connected through a radio-wave interface to a first base station B1, which in turn is connected to a first communication network R1 operated by a first service provider. The system also comprises a second called mobile terminal M2 connected through a radio-wave interface to a second base station B2, which in turn is connected to a second communication network R2 operated by a second service provider.

The communication networks R1,R2 typically include a plurality of network elements. In the case of the GSM (Global System for Mobile Communications) standard, which is currently the most widespread standard for mobile communications, said network elements may include traffic switching elements such as Mobile Switching Centers (MSC), terminal mobility management elements such as Home Location Registers (HLR) and Visitor Location Registers (VLR), and mobile terminal authentication elements known as Authentication Centers (AuC).

In the case of a UMTS (Universal Mobile Telecommunication System) system, said elements may include control and traffic switching elements such as Radio Network Controllers (RNC), terminal mobility management elements such as Home Location Registers (HLR) and Visitor Location Registers (VLR), and mobile terminal authentication elements known as Authentication Centers (AuC).

For a detailed description of the architecture of a GSM or UMTS system, see for example the 3GPP TS 23.002 technical specification.

In FIG. 1, the communication networks R1,R2 communicate with each other through a communication channel C; in reality, said channel may comprise several wired or wireless communication networks.

FIG. 1 illustrates a generic case wherein the two mobile terminals M1, M2 are connected to distinct communication networks R1,R2, respectively. Of course, the calling terminal M1 and the called terminal M2 may occasionally be connected to the same communication network, in which case the first communication network R1 and the second communication network R2 will coincide and the operations described below will be carried out by a single network communicating with both terminals M1, M2.

Figure 2:
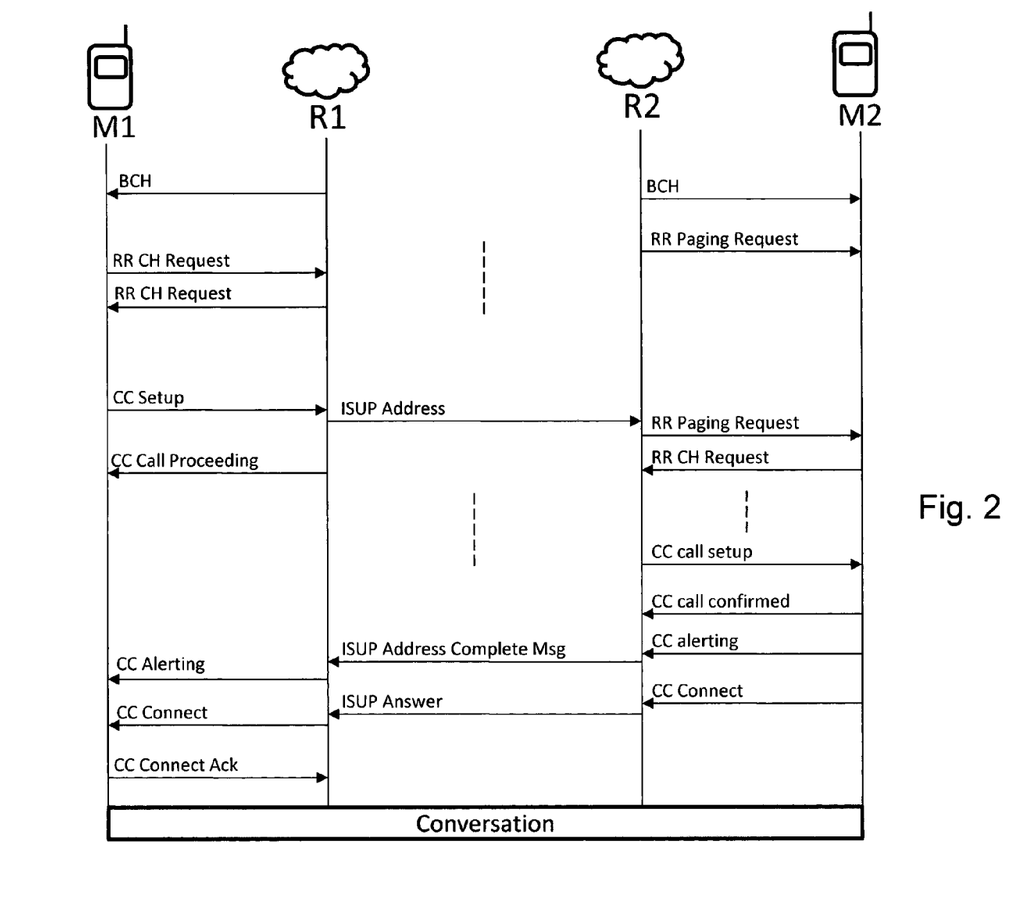
FIG. 2 illustrates a prior-art connection procedure between a calling terminal, connected to a first communication network, and a called terminal, connected to a second communication network in accordance with the 3GPP standard.

FIG. 2 illustrates a procedure for establishing a connection between the elements shown in FIG. 1, i.e. the calling terminal M1, connected to a first communication network R1, and the called terminal M2, connected to a second communication network R2, as described in the 3GPP standard, in particular in the 3GPP TS 24.008 technical specification.

When there are no voice calls, the mobile terminals M1 and M2 are in the inactive state (commonly known as "idle"), whereas when voice calls are established the terminals switch to the active state (known as "connected").

When in the inactive state, a mobile terminal performs a number of operations, such as monitoring a radio channel known as paging channel, or PCH, and/or the broadcast channel, or BCH. The paging channel is typically used by a communication network in order to signal a voice call request to a mobile terminal. The request is broadcast in the cell or group of cells where the mobile terminal to which said call is addressed is located.

When the calling terminal M1 wants to make a voice call to the called terminal M2, a radio resource connection procedure (hereafter called "RR procedure") is carried out, during which messages are exchanged between the calling terminal M1 and the first communication network R1. After the RR procedure has been successfully completed, a control procedure ("CC procedure") is carried out which allows the voice call to be established. During the CC procedure, a series of messages are exchanged among the calling terminal M1, the first communication network R1, the called terminal M2 and the second communication network R2.

In particular, during the CC procedure the calling terminal M1 sends a connection start message ("CC setup") to the first communication network R1. Two different alert messages ("CC alerting" messages) are also sent during the CC procedure to signal that the called terminal M2 is alerting the user about the call request by ringing, vibrating or by any other signalling means. The first "CC alerting" message is sent by the called terminal M2 to the second communication network R2, whereas the second "CC alerting" message is sent by the first communication network R1 to the calling terminal M1.

In the 3GPP standard, the "CC alerting" message is made up of six different information elements.

If the called user accepts the call request, a connection message ("CC connect" message) is sent by the called terminal M2 to the second communication network R2. A similar message is then sent by the first communication network R1 to the calling terminal M1 to notify the latter that the call request has been accepted. In the 3GPP standard, the "CC connect" message is made up of eight different information elements.

Figure 3:
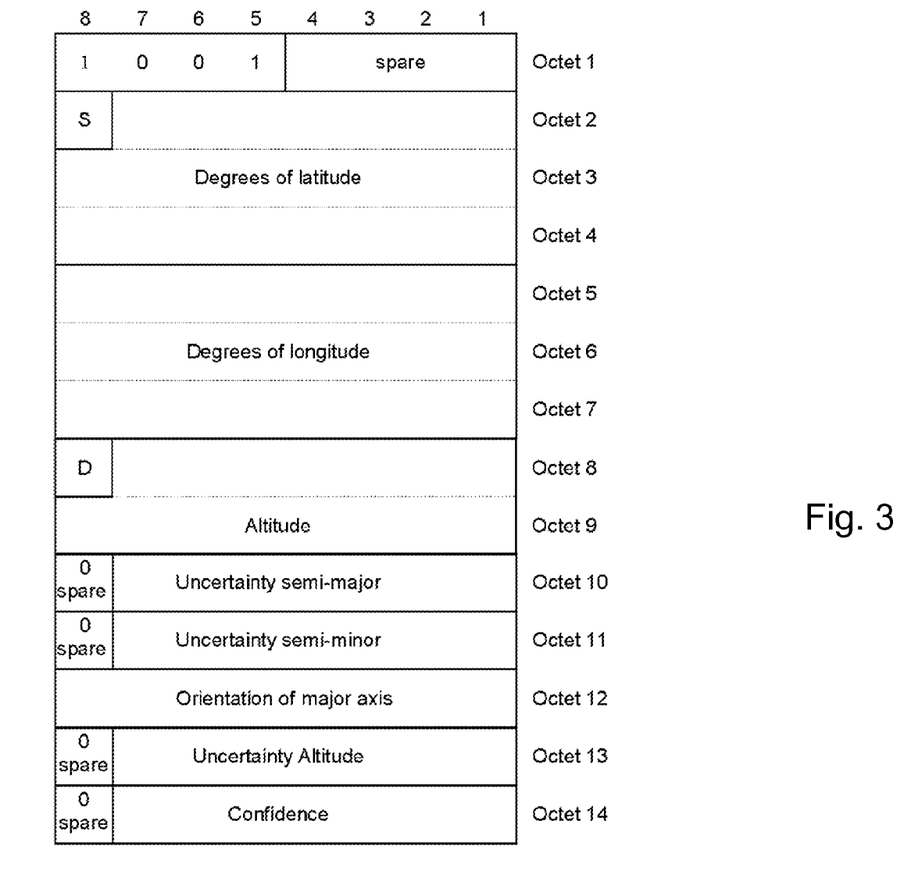
FIG. 3 illustrates a format in which a geographic position of a mobile terminal is transmitted, in accordance with the 3GPP TS 23.032 specification of the 3GPP standard.

FIG. 3 illustrates the format in which a geographic position of a mobile terminal is transmitted, as provided for by the 3GPP standard in the 3GPP TS 23.032 specification. According to this specification, the maximum number of bytes (or octets) is 14, which include information about latitude (octets 2,3,4), longitude (octets 5,6,7), altitude (octets 8 and 9) and uncertainty (octets 10, 11, 13).

SUMMARY OF THE INVENTION

The analysis of the prior art points out the need for being able to localize the geographic position of a mobile terminal when the user thereof cannot, for any reason, make a call.

One object of the present invention is therefore to provide a method of communication of the geographic position of a mobile terminal which allows the calling terminal to receive information about the position of the called terminal, without altering the existing mobile communication standards.

It is a further object of the invention to provide a method of communication of the geographic position of a mobile terminal which can be used for localizing the user of the mobile terminal in emergency situations.

These and other objects of the invention are achieved by a method of communication of the geographic position of a mobile terminal, and the mobile terminal thereof, as claimed in the appended claims, which are intended as an integral part of the present description.

In short, geographic localization of a called terminal is attained by entering position information in the connection messages which are exchanged, upon receiving a call request, between the called terminal and the network to which the called terminal is connected. Said information is forwarded to the communication network to which the calling terminal is connected, which in turns forwards it to the calling terminal. As a voice call is being established, the called user thus discloses to the caller information about his/her own geographic position in a network-transparent manner and before the call is actually established.

Further features of the invention are set out in the appended claims, which are intended as an integral part of the present description.

BRIEF DESCRIPTION OF THE DRAWINGS

The above objects will become more apparent from the detailed description of the method according to the invention, with particular reference to the annexed figures, wherein.

DETAIL DESCRIPTION OF THE PREFFERED EMBODIMENTS

For the purposes of the present description, a mobile terminal may be any electronic device capable of accessing the network services of a mobile operator through a radio interface.

Figure 4:
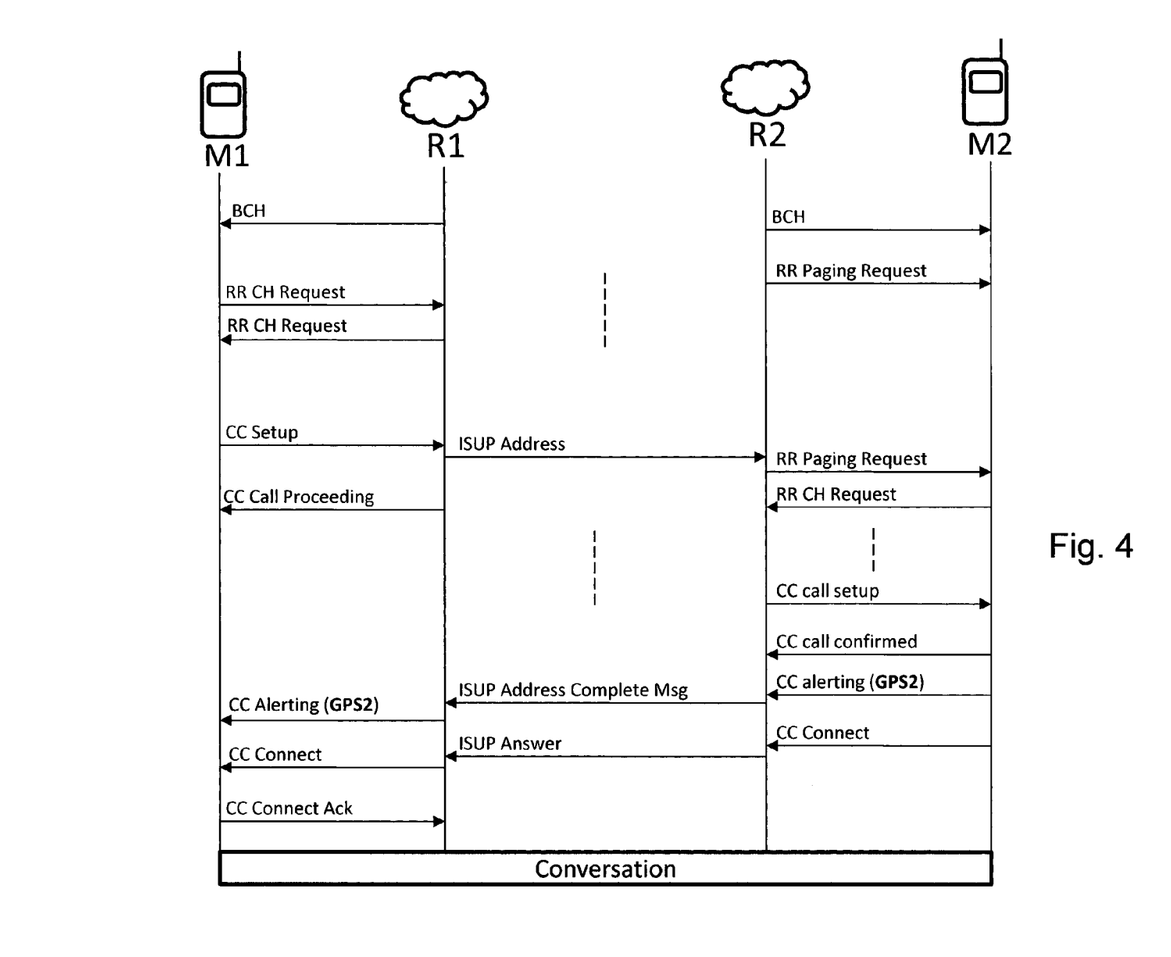
FIGS. 4,5,6 and 7 show flow charts of a first, a second, a third and a fourth embodiments of the present invention, respectively.

With reference to FIG. 4, there is shown a first embodiment of the method according to the present invention, wherein a called terminal M2, equipped with means for detecting its own geographic position, e.g. of the GPS type, enters position information GPS2, e.g. like that shown in FIG. 3, into an information field included in the "CC alerting" message sent to the second communication network R2. A particular information element included in both the "CC alerting" messages and the "CC connect" messages is the so-called "user-user" field, which comprises a number of bytes from 3 to 131. The "user-user" field is therefore sufficiently large to include data pertaining to the geographic position of a mobile terminal M1,M2.

The "CC alerting" message is forwarded by the first communication network R1 of the caller to the calling terminal M1, and includes the position information entered by the called terminal M2 into the "user-user" field.

The calling terminal M1 then extracts the position information GPS2 as soon as it receives the "CC Alerting" message from the first communication network R1. Subsequently it stores this information into an internal memory and shows it on a display of the calling terminal M1, e.g. by displaying the map of the area including the position of the called terminal M2 and marking the position of the called terminal M2. The calling terminal M1 can thus indicate the geographic position of the called terminal M2 prior to actually establishing a call.

Figure 5:
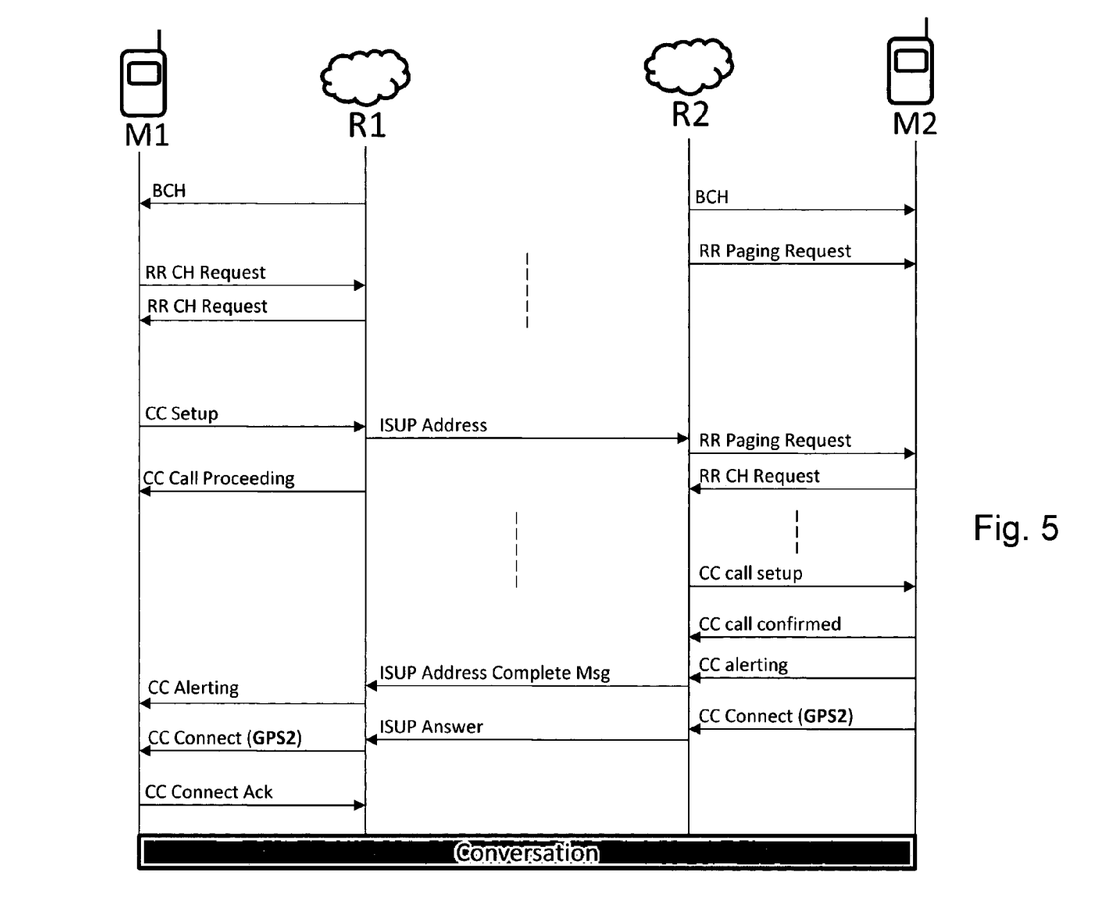

FIG. 5 illustrates a second embodiment of the method of the present invention, wherein the called terminal M2 enters position information GPS2 into the "user-user" information field included in the "CC connect" message sent to the second communication network R2, to which the called terminal M2 is connected. The "CC Connect" message that will be subsequently sent by the caller's first communication network R1 to the calling terminal M1 will include the position information GPS2 entered by the called terminal M2 into the "user-user" field. The calling terminal M1 then extracts the position information GPS2 as soon as it receives the "CC Connect" message from the first communication network R1, therefore before a call is actually established.

Figure 6:
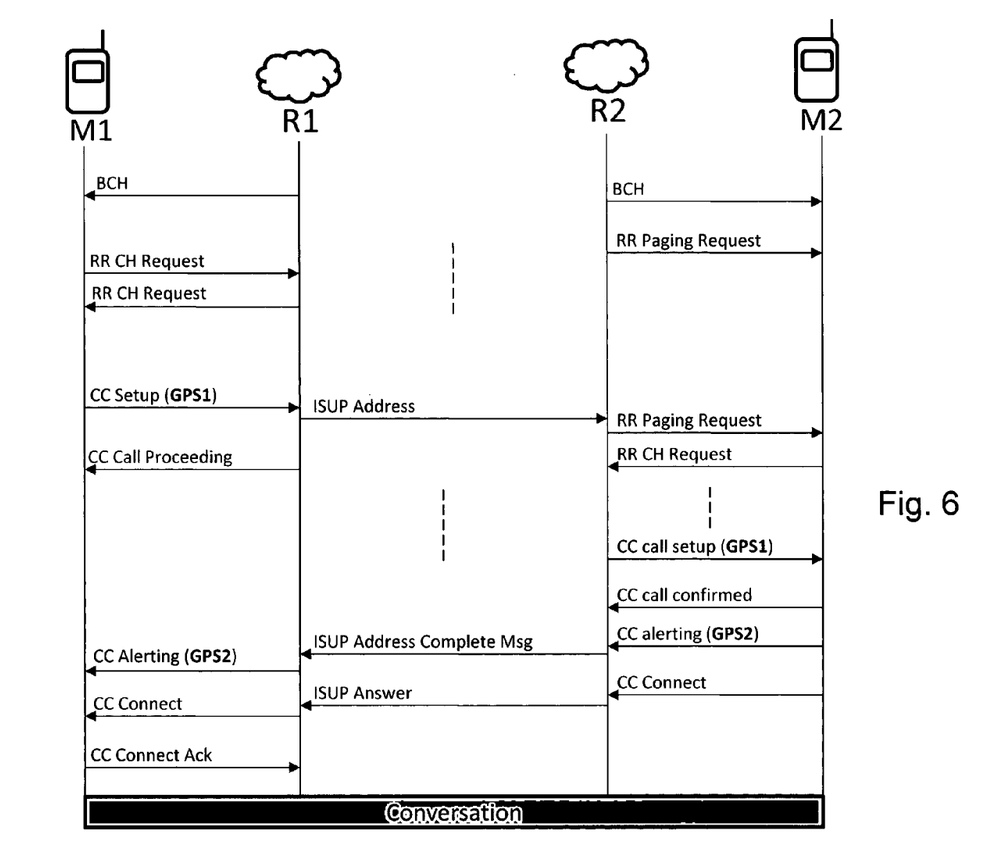

FIG. 6 illustrates a third embodiment of the method of the present invention, wherein the calling terminal M1, which is equipped with means for detecting its geographic position, e.g. of the GPS type, enters position information GPS1 into the "user-user" information field included in the "CC setup" message sent to the first communication network R1, to which the calling terminal M1 is connected. A "CC call setup" message is subsequently sent by the second communication network R2 of the called terminal to the called terminal M2, which message includes the position information GPS1 entered by the calling terminal M1. The called terminal M2 receives the position information of the calling terminal M1 and in its turn enters information about its own position GPS2 into the "user-user" information fields included in the "CC Alerting" message that the called terminal M2 sends to the second communication network R2. The first communication network R1 then sends to the calling terminal M1 a "CC Alerting" message that includes the position information GPS2 of the called terminal M2. This embodiment is clearly advantageous in those applications wherein both terminals M1,M2 need to exchange position information.

Figure 7:
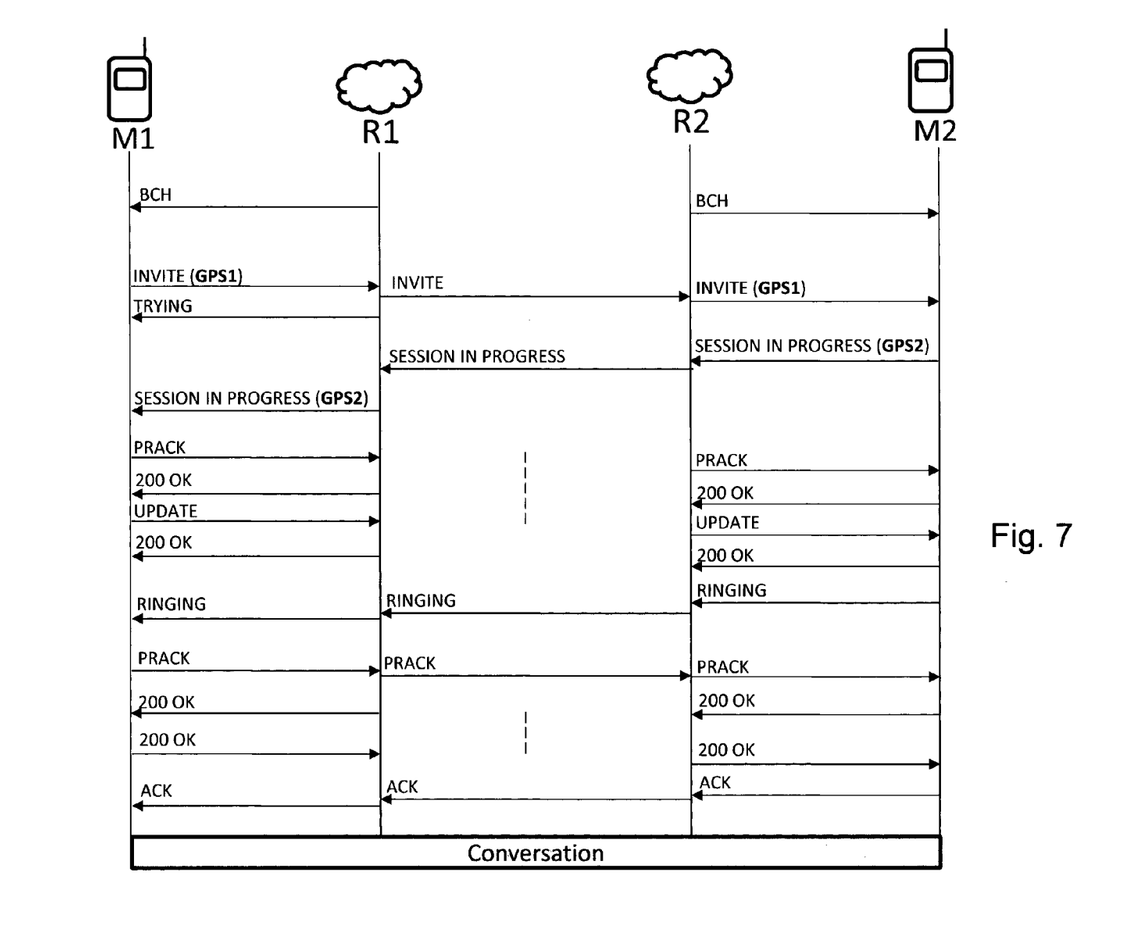

FIG. 7 illustrates a fourth embodiment of the method of the present invention for the case wherein the call between the two terminals M1, M2 takes place by using IMS technology (IP Multimedia Subsystem, where IP stands for Internet Protocol). As known, IMS is a network architecture for converging all telecommunication devices (fixed and mobile ones) into a single IP network. In this embodiment, the protocol in use is SIP (Session Initiate Protocol). The calling terminal M1 enters position information GPS1 into the information field included in the "INVITE" message. The "INVITE" message is sent by the second communication network R2 of the called terminal to the called terminal M2, which thus receives the position GPS1 of the calling terminal M1. The called terminal M2 enters its position information GPS2 into a "SESSION IN PROGRESS" message. Said message is forwarded by the first communication network R1 to the calling terminal M1, which thus receives the position GPS2 of the called terminal M2.

The features of the present invention, as well as the advantages thereof, are apparent from the above description.

The method of communication of the geographic position of a mobile terminal according to the present invention advantageously allows localizing a called mobile terminal without requiring any changes to the existing communication standards.

The method of communication according to the present invention is also advantageous in emergency situations, in particular whenever one needs to localize a user who cannot answer the call. In fact, the method operates without having to establish an actual voice call between the calling terminal and the called terminal.

The method of communication of the geographic position of a mobile terminal, and the receiver thereof, described herein by way of example may be subject to many possible variations without departing from the novelty spirit of the inventive idea; it is also clear that in the practical implementation of the invention the illustrated details may have different shapes or be replaced with other technically equivalent elements.

For example, the format of the geographic position of a user terminal may differ from the one shown in FIG. 3 or may include additional information. The mobile terminals and the networks shown in FIG. 1 may use communication standards other than GSM, such as, for example, the CDMAOne, W-CDMA, CDMA2000 and LTE standards.

In the case wherein the IMS technology and the SIP protocol are used, described in the embodiment shown in FIG. 7, the information about the position of the terminals M1,M2 may be entered into other fields of the messages exchanged when establishing the connection, e.g. fields included in the various acknowledgement messages (also known as ACK).

It can therefore be easily understood that the present invention is not limited to a method of communication of the geographic position of a mobile terminal, but may be subject to many modifications, improvements or replacements of equivalent parts and elements without departing from the novelty spirit of the inventive idea, as clearly specified in the following claims.

The invention claimed is:

1. A method of communication between a calling terminal and a called terminal, which can be connected to each other through at least one mobile communication network, wherein said called terminal includes a device for detecting its geographic position, said method comprising the steps of:
   sending a connection setup message for setting up a voice call from said calling terminal to said called terminal through said at least one communication network, wherein the connection setup message does not include a location request,
   sending an answer message from said called terminal to said calling terminal in reply to said setup connection message through said at least one communication network before sending a connection message from said called terminal to said calling terminal indicating that the voice call is established,
   wherein said called terminal determines its geographic position with the device for detecting its geographic position and enters information about its geographic position detected by said device into said answer message and sends said answer message to said calling terminal.

2. The method of communication according to claim 1, wherein said answer message is an alert message indicating that the called terminal has been alerted, and wherein said geographic position information is entered into an information element of said alert message.

3. The method of communication according to claim 2, wherein the element of said alert message is a user-user element.

4. The method of communication according to claim 1, wherein said answer message comprises a second connection message indicating that the called terminal has accepted a call, and wherein said information about the geographic position of the called terminal is entered into an element of said second connection message.

5. The method of communication according to claim 4, wherein the element of said second connection message is a user-user element.

6. The method of communication according to claim 1, wherein information about the geographic position of the calling terminal is entered into an element of said connection setup message.

7. The method of communication according to claim 6, wherein said information about the geographic position of said calling terminal is sent to the called terminal by at least said communication network within an element of said connection setup message.

8. The method of communication according to claim 1, wherein the messages exchanged among the calling terminal, the called terminal and said at least one mobile communication network are exchanged by using IMS technology.

9. The method of communication according to claim 8, wherein said information about the geographic position of the called terminal is entered into a SESSION IN PROGRESS message of the SIP protocol, and/or said information about the geographic position of the calling terminal is entered into an INVITE message of the SIP protocol.

10. A mobile terminal comprising means for detecting its geographic position, further comprising a device adapted to implement the method of communication according to claim 1.

11. The method of communication according to claim 1, further comprising detecting, by the called terminal, the geographic position.

12. The method of communication according to claim 1, wherein the device for detecting its geographic position comprises a GPS device.

13. The method of communication according to claim 1, wherein the connection message is configured according to a set-up protocol of communication network between the calling terminal and the called terminal.

* * * * *